(12) United States Patent
Noesner et al.

(10) Patent No.: US 9,338,862 B2
(45) Date of Patent: May 10, 2016

(54) TECHNIQUES FOR REMOTE COMMUNICATION WITH A PHOTOCONTROL DEVICE

(71) Applicant: ABL IP Holding LLC, Conyers, GA (US)

(72) Inventors: Kevin E. Noesner, Dublin, OH (US); Terry L. Utterback, McDonough, GA (US)

(73) Assignee: ABL IP Holding LLC, Decatur, GA (US)

( * ) Notice: Subject to any disclaimer, the term of this patent is extended or adjusted under 35 U.S.C. 154(b) by 120 days.

(21) Appl. No.: 14/314,287

(22) Filed: Jun. 25, 2014

(65) Prior Publication Data

US 2015/0382434 A1 Dec. 31, 2015

(51) Int. Cl.
  *H05B 37/02* (2006.01)
  *G08C 17/02* (2006.01)
  *G08B 5/36* (2006.01)
  *H04W 12/06* (2009.01)

(52) U.S. Cl.
  CPC .............. *H05B 37/0272* (2013.01); *G08B 5/36* (2013.01); *G08C 17/02* (2013.01); *H04W 12/06* (2013.01); *H05B 37/0218* (2013.01); *H05B 37/0281* (2013.01); *G08C 2201/50* (2013.01)

(58) Field of Classification Search
  CPC ............ H05B 37/0245; H05B 37/0272; H05B 37/0227; H05B 37/0218; H05B 33/0863; H05B 33/0815
  USPC .......................... 315/149, 158, 307, 312, 318
  See application file for complete search history.

(56) References Cited

U.S. PATENT DOCUMENTS

| 9,204,523 B2* | 12/2015 | Reed ................... H05B 33/0863 |
| 2012/0044350 A1 | 2/2012 | Verfuerth |
| 2013/0342131 A1 | 12/2013 | Recker et al. |
| 2014/0103819 A1 | 4/2014 | Mohan |
| 2015/0382435 A1* | 12/2015 | Noesner ............. H05B 37/0227 315/158 |

OTHER PUBLICATIONS

Non-Final Office Action for U.S. Appl. No. 14/748,659, mailed Mar. 10, 2016, 13 pages.

* cited by examiner

*Primary Examiner* — Haissa Philogene
(74) *Attorney, Agent, or Firm* — Kilpatrick Townsend & Stockton, LLP

(57) ABSTRACT

Disclosed are various embodiments for remote lighting control by a processor of photocontrol device for a light fixture. The photocontrol receives, via a wireless network interface, a request to establish a communication session with a remote device using the wireless network interface. The request includes an authentication credential. A command is received, via the communication session with the remote device, to control light output produced from the light fixture. The photocontrol initiates performance of the command for the light fixture, where the command supersedes any other command from ambient light sensing logic of the photocontrol device. The photocontrol device indicates a result of the performance of the command.

21 Claims, 5 Drawing Sheets

TECHNIQUES FOR REMOTE COMMUNICATION WITH A PHOTOCONTROL DEVICE

BACKGROUND

Lighting systems may be deployed to provide lighting for various environments such as parking lots, roadways, sidewalks, structures, etc. In some of these environments, the illumination from the fixtures may be managed by photocontrols that adjust the amount of light produced based upon the amount of ambient light detected by the photocontrol. For example, a photocontrol placed outside may switch off light output from the light fixture during daylight hours and switch on the light output during the evening.

However, changing the programming of these photocontrols to, for example, disable light output or temporarily switch on the light, may be a complicated task. To accomplish the task, a user often needs to have physical access to the photocontrol, which may be installed in a location that is difficult to access, such as a atop a 40-ft. light pole. The difficulty can be magnified when there are many photocontrols which need to be adjusted.

SUMMARY

Various aspects of the present invention relate to remotely changing the mode of operation of a photocontrol for a light fixture through use of a radio frequency (RF) remote control. In one implementation, a photocontrol device for a light fixture is used to control light output by establishing a communication session with a remote device through use of a wireless network interface. In order to establish the communication session, the remote device may transmit an authentication credential. The wireless network interface may use a low power protocol, such as the Bluetooth® Low Energy (BLE) protocol to facilitate the communication session. The photocontrol device uses the communication session to receive a command to control light output produced from the light fixture. The photocontrol device initiates performance of the command for the light fixture, and the command supersedes any other command from ambient light sensing logic of the photocontrol device. The command may be repeated to other light fixtures in a group to control the group. The photocontrol indicates a result of the performance of the command. The indication may include a visual indication at the light fixture, as well as a confirmation message sent to the remote device.

In another implementation, a remote device is used to control light output of a light fixture by selecting a photocontrol device that manages the light output of the light fixture. The photocontrol device is discovered via wireless network interface of the remote device. The photocontrol device is selected using a user interface of the remote device that includes tactile buttons. The remote device transmits a request to establish a communication session with the photocontrol device using the wireless network interface. The request includes an authentication credential. The remote device uses the communication session to transmit a command to control light output produced from the light fixture. The command supersedes any other command from ambient light sensing logic of the photocontrol device. The remote device indicates a result of the performance of the command. The result is determined based on a response from the photocontrol device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
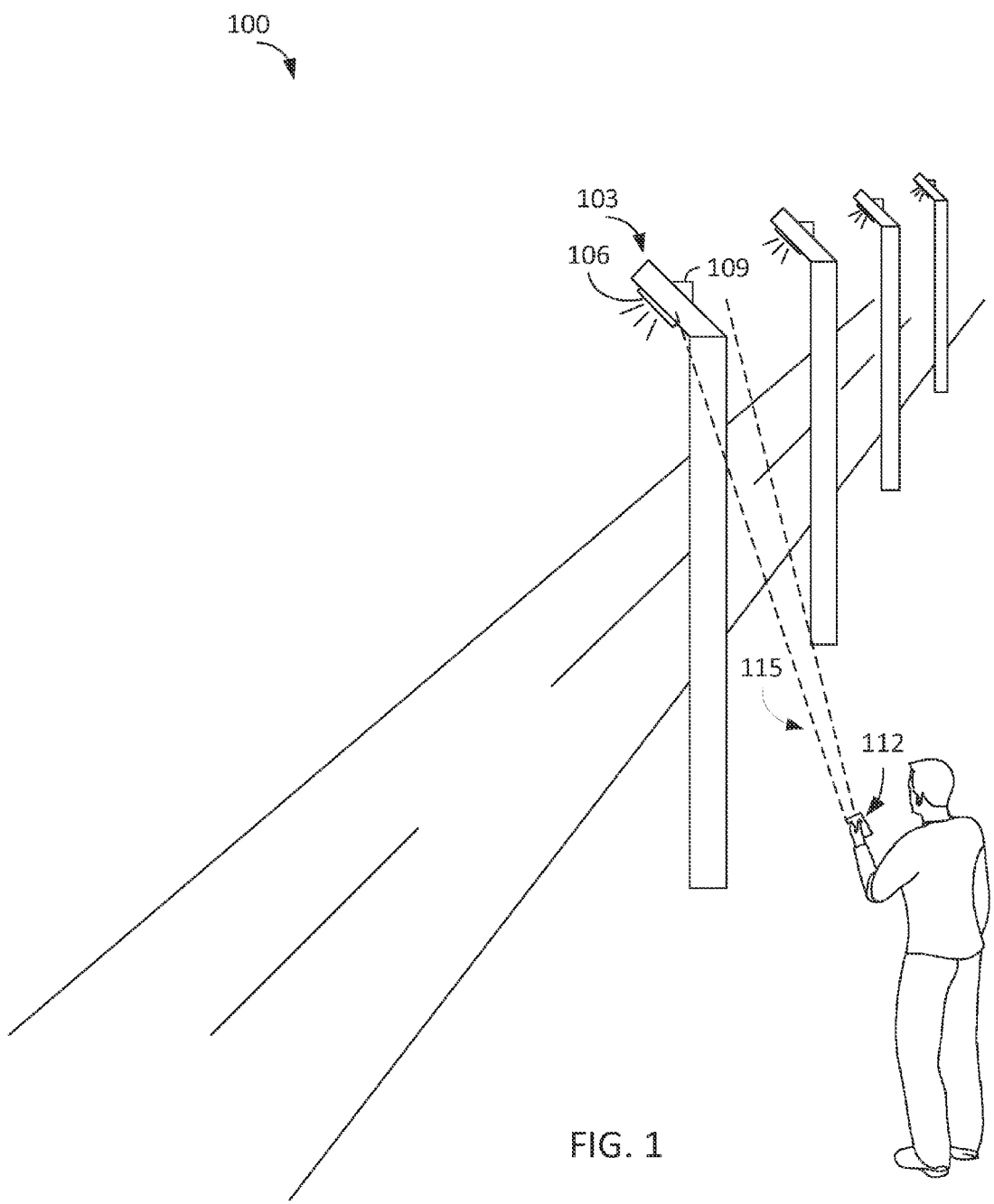
FIG. 1 is a drawing of an exemplary lighting environment according to various embodiments of the present disclosure.

Embodiments of the present invention are generally directed to remotely managing a photocontrol for one or more light fixtures, where the photocontrol includes functionality associated with adjusting the light output from one or more lighting elements associated with each light fixture. With reference to FIG. 1, shown is an exemplary lighting environment 100. The lighting environment 100 includes various lighting fixtures, including the light fixture 103, for illuminating objects in the lighting environment 100, such as the roadway shown in this illustrative example. The light fixture 103 may be affixed to a structure, such as the pole shown, and may include an illuminating element 106, a photocontrol device 109, and other possible components. The illuminating element 106 is capable of producing light output for illuminating objects in the lighting environment 100. The illuminating element 106 may be a light-emitting diode (LED), a fluorescent lamp, an incandescent lamp, and/or other possible light emitting device(s).

The photocontrol device 109 may be used to control the light output from the illuminating element 106 of the light fixture 103, where control of the light output may be determined using one or more inputs to the photocontrol device 109. The photocontrol device 109 for a given light fixture 103 may be a hard-wired component of the light fixture 103, may be attached to a standard receptacle on the light fixture 103, or may be located remotely from the light fixture 103. As an example, the receptacle may be a National Electrical Manufacturers Association (NEMA) multi-pin receptacle (e.g. 3, 5, or 7 pins) to which the photocontrol 109 may be removably attached. The photocontrol device 109 may sense the ambient light in the local area and modify the light output of the light fixture 103 based on the amount of ambient light. For example, the photocontrol device 109 may be programmed to turn off the illuminating element 106 for a light fixture 103 when the detected amount of light exceeds a threshold (e.g. during daylight), and to turn on the illuminating element 106 when the amount of light does not reach the threshold (e.g. during evening).

In addition to input from an ambient light sensor, the photocontrol device 109 may also receive input from a remote device 112 via a wireless network interface (e.g. a BLE network interface). After establishing a communication session over a network 115 between the remote device 112 and photocontrol 109, the remote device 112 may send commands to modify the light output or other behavior of the light fixture 103. In some implementations, the communication session may be "point-to-point," defined herein to mean a direct communication session between the remote device 112 and the photocontrol 109, without the use of intermediate network devices (e.g. network routers, switches, etc.). The commands may override the ambient light sensing logic of the photocontrol device 109, whereby the command may be effective for a predefined time period or until occurrence of an event (e.g. effective until the amount of light reaches a threshold). In the following discussion, further description of the system and its components is provided, followed by a discussion of the operation of the same.

Figure 2:
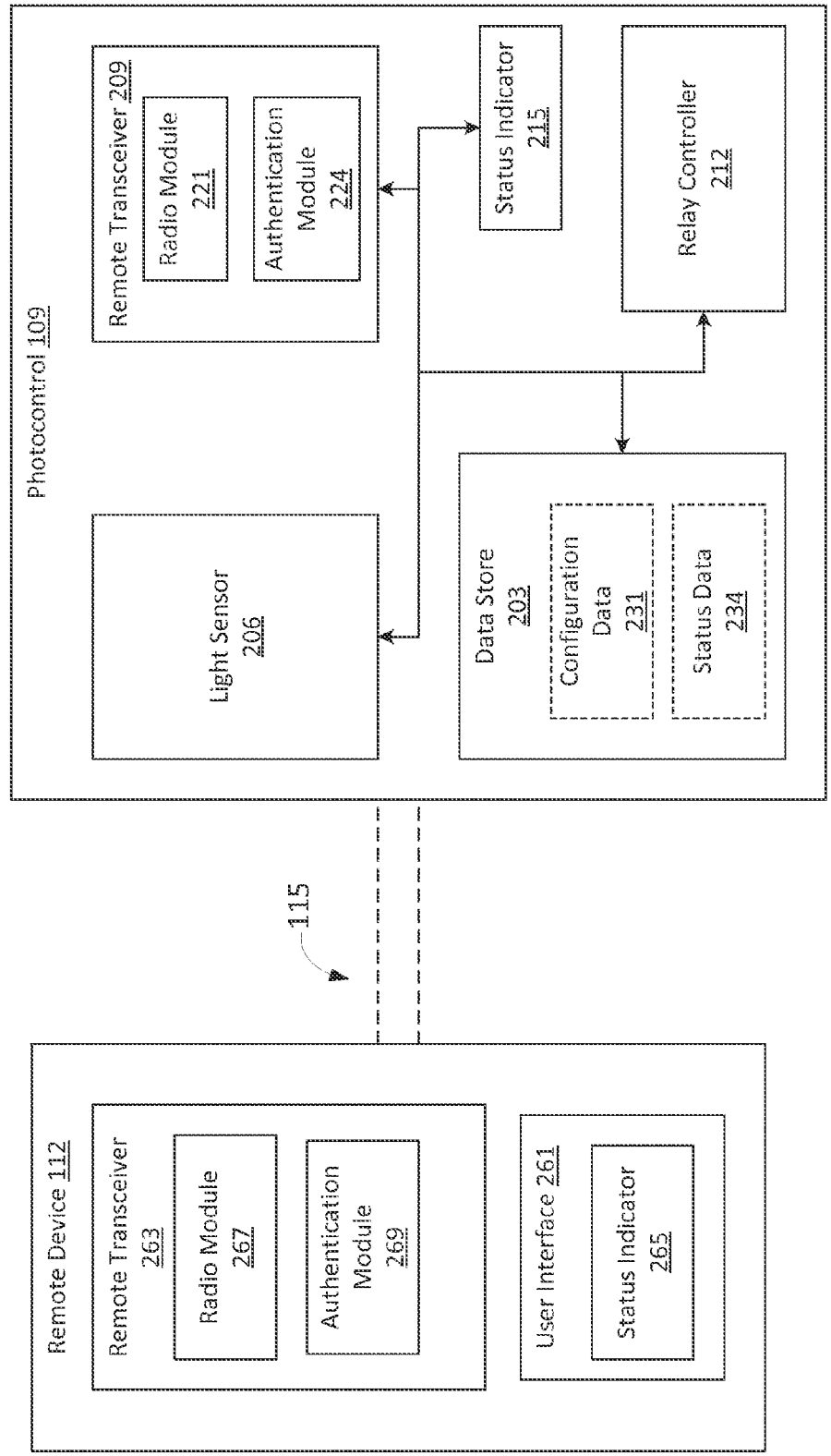
FIG. 2 is a drawing of a remote communication scenario that may occur in the lighting environment according to various embodiments of the present disclosure.

With reference to FIG. 2, shown is an exemplary remote communication scenario 200 that may occur in the lighting environment 100 according to various embodiments. This remote communication scenario 200 includes the photocontrol 109 and the remote device 112, which are in data communication with each other via the network 115. The network 115 includes wireless networks such as may be defined by Bluetooth (including BLE), WiFi™, the IEEE 802.15 family, or other possible technology standards and protocols.

The photocontrol 109 comprises a device to control the light output from one or more associated light fixtures. Alternatively, the photocontrol 109 can represent a plurality of such devices which may be in communication with the remote device 112. Various functionality may be executed in the photocontrol 109 according to various embodiments. Also, various data is stored in a data store 203 that is accessible to the photocontrol 109. The data store 203 may be representative of a plurality of data stores 203 as can be appreciated. The data stored in the data store 203, for example, is associated with the operation of the various functional entities described below.

The components included on the photocontrol 109, for example, include a light sensor 206, a remote transceiver 209, a relay controller 212, a status indicator 215, and other components, or functionality not discussed in detail herein. The light sensor 206 reports the amount of ambient light that it detects, which the photocontrol 109 may use as an input or factor for determining a level of light output from the associated light fixture. The radio transceiver 209 facilitates establishing the network 115 with a remote device 112 through which commands can be received for the photocontrol 109. Some of these received commands may be used as input or factors by the photocontrol 109 for determining a level of light output from a light fixture, as well as other possible purposes.

The radio transceiver 209 comprises a radio module 221, an authentication module 224, and other possible components. The radio module 221 provides a wireless network interface to facilitate establishing the network 115 using a radio frequency (RF) communication link with the remote device 112. The authentication module 224 is used to authenticate the remote device 112 as a device from which a command to the photocontrol 109 should be accepted via the network 115. The authentication may be carried out using an authentication protocol included in a protocol of the network 115, such as a Bluetooth PIN, and/or may use other authentication protocols as can be appreciated. The authentication module 224 may use one or more credentials stored in the photocontrol 109 during the course of the authentication.

The relay controller 212 determines the actions to undertake for the photocontrol 109 related to light output from the light fixture based on inputs received from the light sensor 206 and/or the remote transceiver 209. For example, based on input received via the radio transceiver 209, the relay controller 212 may determine that light output from a light fixture should be turned off and may initiate the action by signaling a relay to turn-off power to the lighting element(s) for the light fixture. The relay controller 212 may be configured via programming and parameters that can be stored in the photocontrol 109.

The status indicator 215 may be made up of one or more components that provide an indication of the status of various functions of the photocontrol 109. For example, the status indicator 215 may comprise a small light, a speaker capable of producing an audible indication, and/or other possible indication mechanisms. In some implementations, the lighting element of the light fixture may also be used as part of the status indicator 215. For example, the lighting element of a light fixture may flash when a communication session is being attempted with the photocontrol 109 managing the light fixture. As another example, the status indicator may be an small LED light that is red when the photocontrol 109 is not communicating with a remote device 112, and is green if a communication session with a remote device 112 is established.

The data stored in the data store 203 includes, for example, configuration data 231, status data 234, and potentially other data. The configuration data 231 can include programming and/or parameters used to configure components of the photocontrol 109 such as the relay controller 212, credentials used to authenticate a remote device 112, and/or other possible data. The status data 234 includes a record of the state of various components and activities of the photocontrol 109. For example, the status data 234 may include data indicating that the current state of a light of a light fixture is "off" as a result of action by the relay controller 212 based on input from the light sensor 206. The data stored in the status data 234 may be stored and read by the various components of the photocontrol 109. In some embodiments, the status data 234 may keep all or a portion of the historical data stored in the status data 234, such as the past actions initiated by the relay controller 212.

The remote device 112 is representative of the types of remote devices that may be used to communicate with the photocontrol 109 via the network 115. The remote device 112 may comprise, for example, an RF remote control device, such as a keyfob, or a computer system, such as a smartphone, tablet computer, or other devices with like capability. The remote device 112 may also include a user interface 261, remote transceiver 263, and other possible components. The user interface 261 may comprise, for example, one or more devices such as tactile buttons and/or a display such as a liquid crystal display (LCD), LED display, organic light emitting diode (OLED) display, or other types of display devices. In some implementations, the display may be touch-sensitive. The user interface 261 may also include a status indicator 265 that provides an indication of the status of various functions of the remote device 112 and photocontrol 109. For example, the status indicator 265 may comprise a small light, a speaker capable of producing an audible indication, and/or other possible indication mechanisms.

The radio transceiver 263 comprises a radio module 267, authentication module 269, and other possible components. The radio module 267 provides a wireless network interface to facilitate establishing the network 115 using an RF communication link with the photocontrol 109. The authentication module 269 is used to authenticate the remote device 112 to the photocontrol 109 via the network 115. The authentication module 269 may use one or more credentials stored in the remote device 112 during the course of the authentication.

Next, a general description of the operation of the various components of the communication scenario is provided. To begin, a user of the remote device 112 may provide input to the user interface 261 requesting to establish a communication session with the photocontrol 109 for a light fixture. The input may be received, for example, through a tactile button of a keyfob RF remote control. Upon receiving the input, the remote device 112 may begin identifying any photocontrol devices 109 within range of the radio transceiver 263. The identification process may be carried out according to the one or more protocols supported by the remote transceiver 263, such as Bluetooth, WiFi, etc. The status indicator 265 may be used to indicate to the user that a search for any nearby photocontrol(s) 109 is underway by, for example, blinking an LED light on the remote device 112.

If a photocontrol 109 is identified, the remote device 112 may initiate a point-to-point communication session with the photocontrol 109 by establishing the network 115. If multiple photocontrols 109 are identified, various methods may be used to select a single photocontrol 109 with which to establish communications, such as based on the received signal strength, based on the order of identification, manual selection by the user, or upon other bases as can be appreciated. The status indicators 215, 265 may be used to indicate that the communication session is being established between the remote device 112 and the photocontrol 109, such as by flashing an indicator light.

In order to establish the communication session with the photocontrol 109, the remote device 112 may transmit one or more credentials via the network 115. The credential(s) may be, for example, a Bluetooth PIN, a data key, etc. Thereafter, the photocontrol 109 may authenticate the credential received from the remote device 112 using the authentication module 224. If the credential is successfully authenticated, the communication session is established between the photocontrol 109 and the remote device 112, via the network 115. In some implementations, the credential of a photocontrol 109 may also be reprogrammed (i.e. modified or replaced) by the user of the remote device 112 upon successful authentication. The status indicators 215, 265 may be used to indicate that the communication session is successfully established between the remote device 112 and the photocontrol 109, such as steadily illuminating an indicator light. A confirmation message may be sent to the remote device 112 to confirm establishment of the communication session. The confirmation message may further include status information for the light fixture(s) managed by the photocontrol 109. For example, the status information may include whether the fixture is currently in an enabled or disabled state.

Once the communication session is established, the user interface 261 of the remote device 112 may be used to send commands to the photocontrol 109, such as commands to manipulate light output from the light fixture. For example, a command may switch on or off the light output for the light fixtures(s) in a manner that temporarily overrides any input received from the light sensor 206. The temporary override may be time-driven (e.g. override the light sensor 206 for the next 30 minutes), event-driven (e.g. override the light sensor 206 until the next light threshold is met), and/or on other bases as can be appreciated. As another example, a command may instruct the photocontrol 109 to enable or disable the light output from the light fixture. When the light fixture is in the disabled state, light output may remain off at least until the photocontrol 109 receives a command to enable the light output. Once the light output is enabled, the photocontrol 109 may return to normal operation, whereby the light output is switched on based upon the amount of ambient light or a command from the remote device 112 to turn the light output (e.g. a temporary override).

A command received by the photocontrol 109 via the communication session with the remote device 112 may be performed by the relay controller 212. For example, if the command is a temporary override to turn on the light output for 30 minutes, the relay controller 212 may engage the appropriate relays to turn on the light, then start a timer to mark the end of the override. The relay controller 212 may also transmit a confirmation message to the remote device 112 indicating a result of the command (e.g. success or failure), as well as activate the status indicator 215. The remote device 112 may activate the status indicator 265 based on the confirmation. Depending on the command requested, confirmation of the command by the photocontrol 109 may be self-evident. For example, if the command is to turn on the light and the light turns on, then the command was likely received.

The user interface 261 of the remote device 112 may also receive input associated with selecting a different photocontrol 109 when more than one photocontrol is within range of the remote device 112. For example, upon receiving input to select another photocontrol 109 to manage, the remote device may send a command to the current photocontrol 109 to end the communication session, while a request to establish a new communication session is transmitted to a different photocontrol. The other photocontrol may be selected as the next one from a compiled list of neighboring photocontrols through use of a tactile button on the user interface 261. As described previously, the list of neighboring photocontrols may be ordered according to various bases, such as received signal strength. Alternatively, the other photocontrol may be selected using a display in the user interface 261. The status indicator 265 may be used to show that the other photocontrol is presently being selected, such as an indicator light in the user interface 261. The color of the light may also communicate whether the other photocontrol is presently in an enabled or disabled state. The status indicator 215 of the photocontrol 109 may also indicate that a communication session is beginning and/or ending by, for example, flashing a light of the status indicator 215.

If during the course of operation, no input is received through the user interface 261 of the remote device 112 for a period of time, the remote device 112 may enter a low-power "sleep" state in order to preserve battery life. For example, if a user sends no commands to the photocontrol 109, nor provides any other input through the user interface 261 for five minutes, the remote device may enter the sleep state. In some implementations, the remote device 112 may "wake" from the sleep mode after input is received from the user interface 261 and may resume the communication session with the same photocontrol 109. In other implementations, no previous state information may be preserved from before entering the sleep state. Similarly, the photocontrol 109 may terminate a communication session after a period of time if no commands have been received from the remote device 112 participating in the communication session. This may be useful to prevent the accumulation of stale communication sessions for which the corresponding remote device 112 has, for example, gone out of communication range, gone to sleep, etc.

Figure 3:
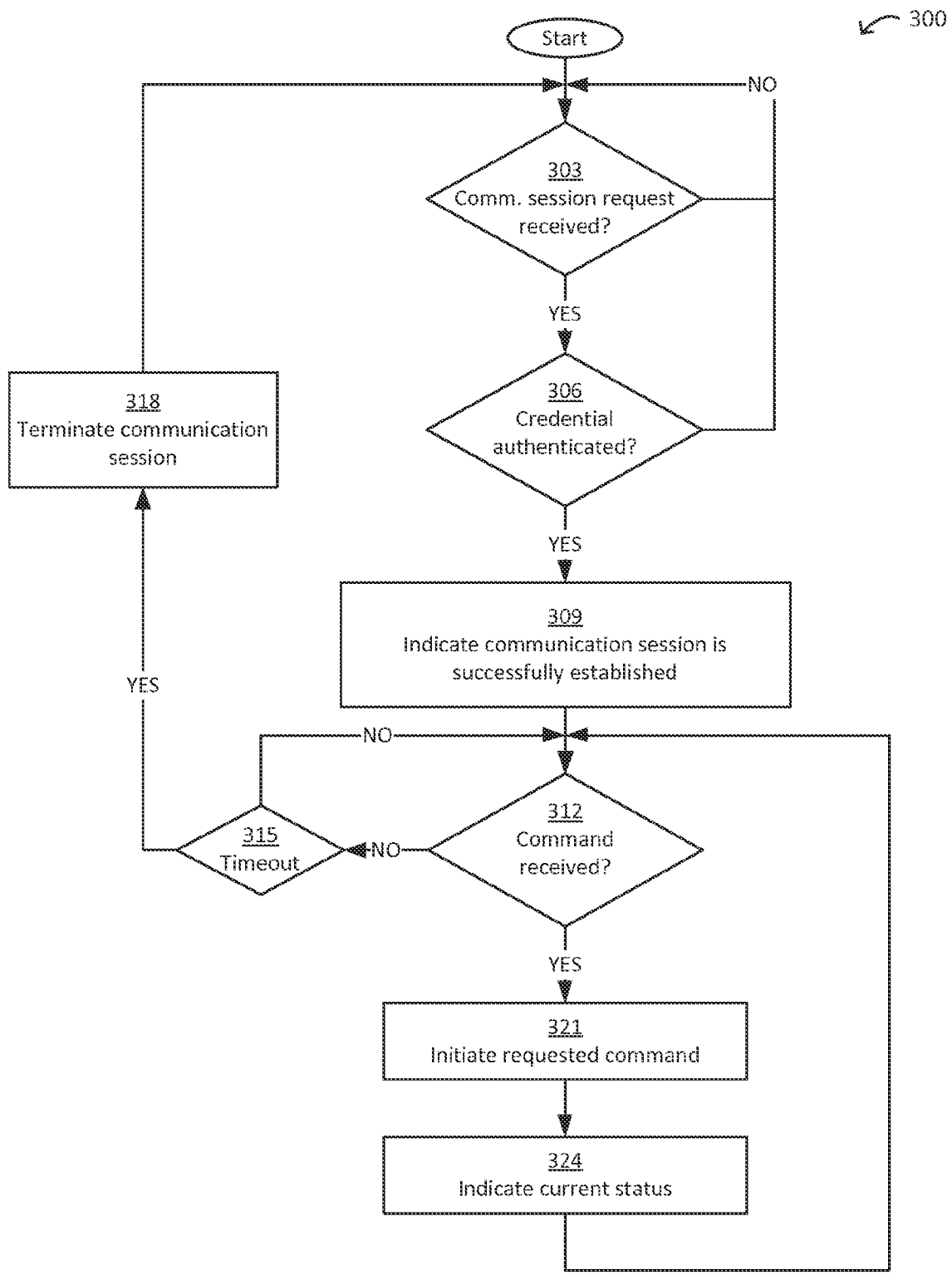
FIG. 3 is a flowchart illustrating one example of functionality implemented as portions of a photocontrol implemented in the remote communication scenario of FIG. 2 according to various embodiments of the present disclosure.

Referring next to FIG. 3, shown is a flowchart that provides one example of the operations for a method 300 of a photocontrol 109 in the remote communication scenario 200 according to various embodiments. It is understood that the flowchart of FIG. 3 provides merely an example of the many different types of functional arrangements that may be employed to implement the operations of the method 300 as described herein. The operations depicted in the flowchart of FIG. 3 may be initiated once the photocontrol 109 is available for communication.

Beginning with block 303, the photocontrol 109 determines whether a request to establish a point-to-point communication session has been received from a remote device 112. In some implementations, the remote device 112 may request the communication session with the photocontrol 109 by establishing the network 115. If no such request has been received, execution of the method 300 returns to block 303. Alternatively, if a request to establish a communication session has been received, then in block 306, the photocontrol 109 determines whether a credential supplied by the remote device 112 has been successfully authenticated. In order to establish the communication session with the photocontrol 109, the remote device 112 transmits one or more credentials via the network 115. The credential(s) may be, for example, a Bluetooth PIN, a data key, etc. Thereafter, the photocontrol 109 may authenticate the credential received from the remote device 112 using the authentication module 224.

If authentication of the credential was not successful, execution of the method 300 returns to block 303. Alternatively, if authentication of the credential was successful, then, in block 309, the communication session is established between the photocontrol 109 and the remote device 112, via the network 115. The photocontrol 109 may transmit a confirmation message to the remote device 112 confirming that the communication session was successfully established and possibly including the current state of the photocontrol 109. For example, the current state may include whether the light fixture managed by the photocontrol 109 is in an enabled or disabled state. The status indicators 215, 265 may be used to indicate to a user that the communication session is successfully established between the remote device 112 and the photocontrol 109. For example, the status indicator 265 may show a steady light as a result of the communication session being established, and the status indicator 215 may briefly flash the lighting element of the light fixture.

Next, in block 312, the photocontrol 109 determines whether a command was received from the remote device 112 via the communication session. If no command was received, in block 315, the photocontrol 109 determines whether the communication session has timed out. Alternatively, if a command was received, execution of the method 300 proceeds to block 321. In block 315, if a timeout has not occurred, then execution of the method 300 returns to block 312. If a timeout has occurred, in block 318, the photocontrol 109 may terminate the communication session with the remote device 112. Once the communication session has terminated, execution of the method 300 returns to block 303.

Returning to the description of block 321 where a command had been timely received from the remote device 112, the relay controller 212 of the photocontrol 109 performs the requested command. For example, the command may instruct the photocontrol 109 to enable or disable the light output from the light fixture. When in the disabled state, the relay controller 212 may disregard any input from the light sensor 206 or other ambient light sensing logic and leave the light output of the light fixture in an off state until the photocontrol 109 receives a command to enable the light output. Once the light output is enabled, the photocontrol 109 may return to normal operation, whereby the relay controller 212 may be responsive to the ambient light sensing logic or a command from the remote device 112 to switch on the light output (e.g. a temporary override).

Then, in block 324, the relay controller 212 transmits a confirmation message to the remote device 112 indicating a result of the command (e.g. success or failure), as well as activates the status indicator 215. For example, the status indicator 215 may briefly flash in quick succession if the light fixture is now disabled, or flash in in a slower succession if the light fixture is now enabled. Similarly, the remote device 112 may activate the status indicator 265 based on the confirmation message. For example, based on the confirmation message received from the photocontrol 109, the status indicator 265 may be green in color if the light fixture is enabled, or red in color if the light fixture is disabled. Thereafter, execution of the method 300 returns to block 312.

Figure 4:
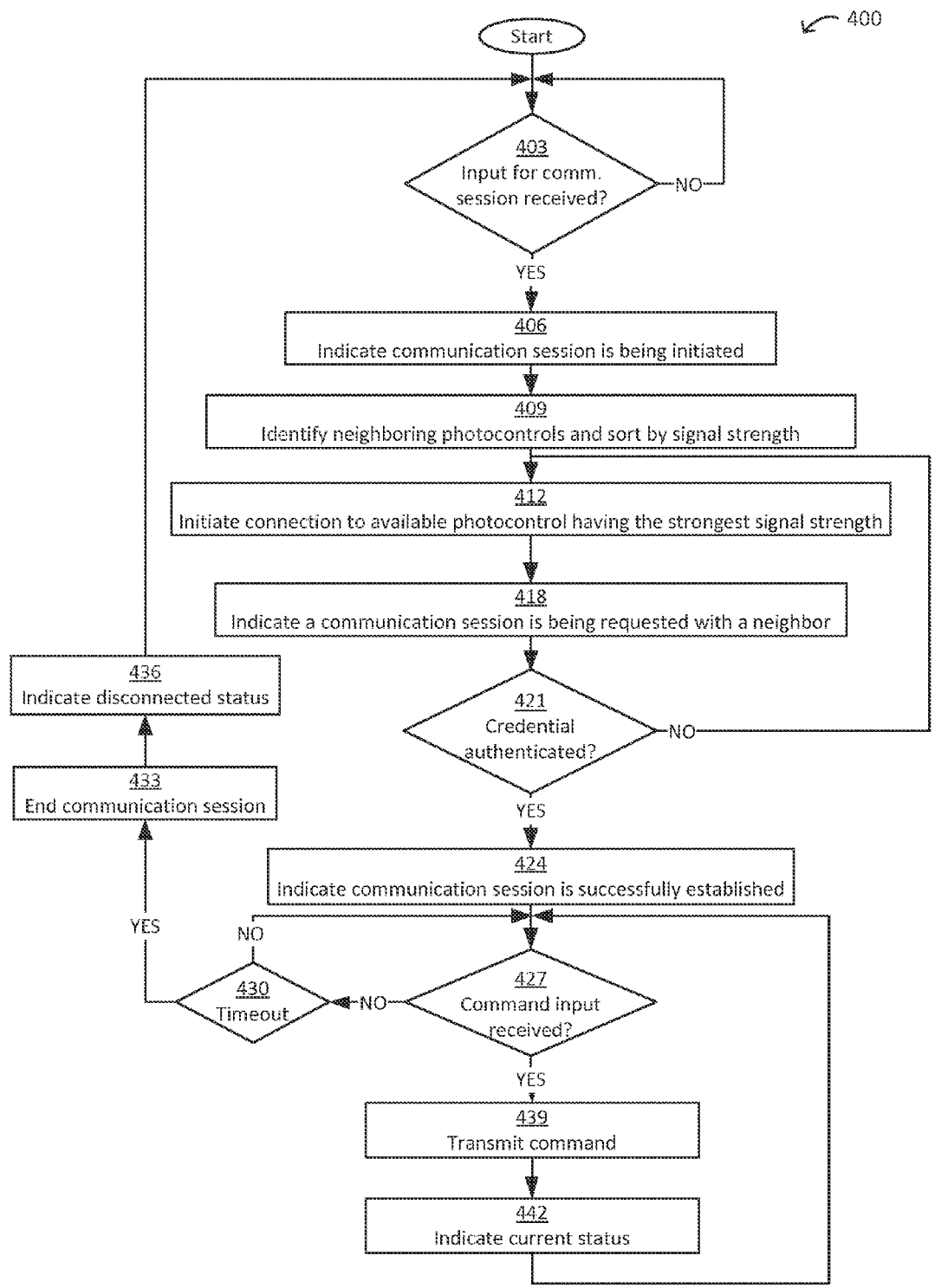
FIG. 4 is a flowchart illustrating one example of functionality implemented as portions of a remote device implemented in the remote communication scenario of FIG. 2 according to various embodiments of the present disclosure.

Moving on to FIG. 4, shown is a flowchart that provides one example of the operations for a method 400 of the remote device 112 in the remote communication scenario 200 according to various embodiments. It is understood that the flowchart of FIG. 4 provides merely an example of the many different types of functional arrangements that may be employed to implement the operations of the method 400 as described herein. The operations depicted in the flowchart of FIG. 4 may be initiated once the remote device 112 is available for communication.

Beginning with block 403, the remote device 112 may determine whether input has been received through the user interface 261 requesting to establish a communication session with a photocontrol 112 for a light fixture. The input may be received, for example, through a tactile button of an RF remote control, selection through a display, etc. If input has not been received, execution of the method 400 returns to block 403. Alternatively, if input to connect to a photocontrol 109 is received through the user interface 261, in block 406, the remote device 112 uses the status indicator 265 to confirm to the user that the operations to connect to a photocontrol 109 have begun. For example, the status indicator 265 may include an LED light that blinks to indicate that the operations to connect to a photocontrol 109 have begun.

Next, in block 409, the remote device 112 may begin identifying any photocontrols 109 within range of the radio transceiver 263. The identification process may be carried out according to the one or more protocols supported by the remote transceiver 263, such as Bluetooth, WiFi, etc. In this exemplary implementation, if multiple photocontrols 109 are identified, they may be collected into an ordered list of photocontrols 109 that are sorted based on, for example, signal strength as received by the remote device 112.

Then, in block 412, the remote device 112 may transmit a request to initiate a communication session with the selected photocontrol 109, where the request may include one or more credentials. In this exemplary implementation, if multiple photocontrols 109 are identified, an available photocontrol 109 having the strongest received signal strength may be selected. Other implementations are also possible to select a single photocontrol 109 with which to establish communications, such as based on the order of identification, manual selection by the user, or other bases as can be appreciated. The credential(s) may be, for example, a Bluetooth PIN, a data key, and/or other possible credentials appropriate for the communication session. Establishing the communication session may be carried out by establishing a network 115 with the selected photocontrol 109, but may, in some implementations, require additional authentication and/or encryption operations beyond what is necessary to establish the network 115.

For example, if the remote device 112 is communicating with the photocontrol 109 via Bluetooth, the communication session may be established when the network 115 is established using a Bluetooth PIN as an authentication credential.

As another example, if the remote device 112 is communicating with the photocontrol 109 via unencrypted WiFi, the network 115 may be implemented using WiFi, while the authentication for the communication session may be implemented as another layer atop the network 115. In some implementations, the communication session may also implement encryption in order to retain confidentiality of the credential(s) during transmission between the remote device 112 and the photocontrol 109. The encryption may be carried out using the Advanced Encryption Standard (AES), Triple Data Encryption Standard (3-DES), etc.

Continuing, in block 418, the status indicator 265 may be used to indicate that a communication session is being requested with a neighboring photocontrol 109 by, for example, quickly flashing a light of the status indicator 265. Next, in block 421, the remote device 112 determines whether the credential was successfully authenticated based on a confirmation message received from the photocontrol 109. If the credential failed to authenticate, then the method 400 returns to block 412, where the next available photocontrol 109, if any, from the list of neighboring photocontrols may be selected. Alternatively, if the authentication is successful, in block 424, the remote device 112 may indicate the establishment of the communication session to a user by, for example, displaying a steadily illuminated light of the status indicator 265.

Then, in block 427, the remote device 112 determines if input for a command was received by a user through the user interface 265. If no input was received, in block 430, the remote device 112 determines whether a time out has occurred. Alternatively, if input was received, execution of the method 400 proceeds to block 439. In block 430, if a timeout has not occurred, then execution of the method 400 returns to block 427. If a timeout has occurred, in block 433, the remote device 112 may terminate the communication session with the photocontrol 109. Thereafter, in block 436, the remote device 112 may indicate the disconnected state, then enter a sleep state. Once input is again received through the user interface 265, the remote device 112 may wake and return to block 403.

Returning to block 439 where input for a command was timely received through the user interface 265, the command may be transmitted to the photocontrol 109 via the communication session. For example, the command may include a temporary override of the light output from the light fixture, enabling/disabling light output from the light fixture, etc. Next, in block 442, the remote device 112 may indicate the result of the command using the status indicator 265, where the result is received as a confirmation message from the photocontrol 109. Thereafter, execution of the command may return to block 427.

Figure 5:
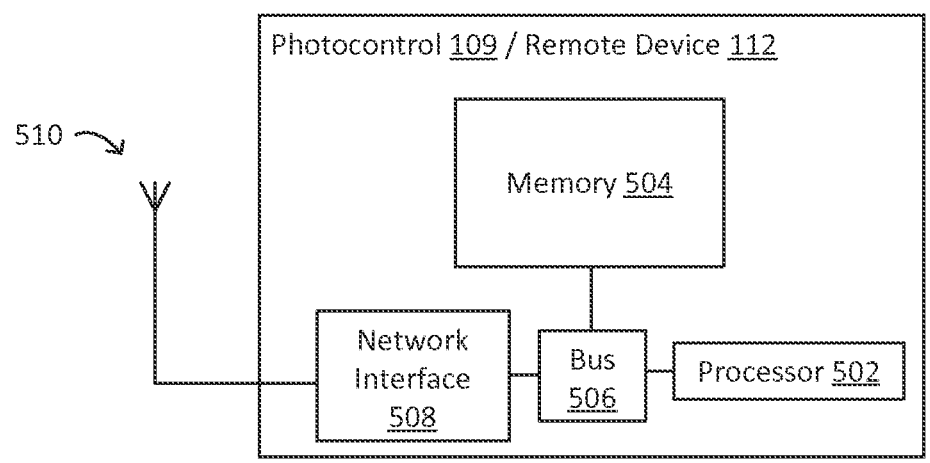
FIG. 5 is a schematic block diagram that provides one example illustration of a photocontrol device/remote device employed in the remote communication scenario of FIG. 2 according to various embodiments of the present disclosure.

Next, in FIG. 5, shown is a block diagram depicting an example of a photocontrol 109/remote device 112 used for implementing the techniques disclosed herein within a lighting environment 100.

The photocontrol 109/remote device 112 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The photocontrol 109/remote device 112 can include a bus 506 that can communicatively couple one or more components of the corresponding device. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a photocontrol 109 and remote device 112 to store and execute programming code.

The photocontrol 109/remote device 112 can also include a network interface device 508. The network interface device 508 can be a transceiving device configured for wireless communication via an antenna 510. A non-limiting example of the network interface device 508 is an RF transceiver and can include one or more components for establishing communication sessions via the network 115.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for remote lighting control by a processor of a photocontrol device removably attached to a light fixture, comprising:
   receiving, via a wireless network interface, a request to establish a point-to-point communication session with a remote device using the wireless network interface, the request comprising an authentication credential;
   receiving, via the communication session with the remote device, a command to control light output produced from the light fixture;
   initiating performance of the command for the light fixture, the command superseding any other command from ambient light sensing logic of the photocontrol device; and
   indicating a result of the performance of the command.

2. The method of claim 1, wherein said indicating the result of the performance of the command comprises activating a status indicator for the light fixture, the status indicator indicating the result.

3. The method of claim 1, wherein the light fixture is one of a plurality of light fixtures controlled by the photocontrol device, said initiating performance of the command comprising initiating performance of the command in the light fixtures.

4. The method of claim 1, wherein the communication session with the remote device is carried out according to a Bluetooth wireless technology standard.

5. The method of claim 1, wherein said indicating the result of the performance of the command comprises transmitting a confirmation message to the remote device, the confirmation message indicating the result.

6. The method of claim 1, wherein, upon said receiving the request to establish a communication session, the light fixture visibly identifies itself as the light fixture responding to the request through activation of a lighting element of the light fixture.

7. The method of claim 1, the command comprising disabling or enabling light output from the light fixture.

8. The method of claim 7, wherein the command is in effect until a subsequent command is received via the wireless network interface.

9. The method of claim 1, wherein the command is in effect for a predefined period of time, the light output from the light fixture being determined based on the ambient light sensing logic after this predefined period of time.

10. The method of claim 1, further comprising receiving, via the communication session, a command to reprogram the authentication credential.

11. A method for a remote device to control light output of a light fixture, comprising:
    selecting, via a wireless network interface, a photocontrol device that manages the light output of the light fixture, the photocontrol device being removably attached to the light fixture;
    transmitting, via the wireless network interface, a request to establish a point-to-point communication session with the photocontrol device using the wireless network interface, the request comprising an authentication credential;
    transmitting, via the communication session with the remote device, a command to control light output produced from the light fixture, the command superseding any other command from ambient light sensing logic of the photocontrol device;
    receiving, via the communication session, a confirmation message from the photocontrol device; and
    indicating a result of the performance of the command, the result determined by the confirmation message from the photocontrol device.

12. The method of claim 11, wherein said indicating the result of the performance of the command comprises activating a status indicator for the remote device, the status indicator indicating the result.

13. The method of claim 11, further comprising discovering a plurality of neighboring photocontrol devices within range of the wireless network interface of the remote device, the photocontrol device being selected from the neighboring photocontrol devices.

14. The method of claim 13, wherein said selecting the photocontrol device is based upon input received from a user interface of the remote device.

15. The method of claim 14, wherein the user interface comprises at least one tactile button on the remote device.

16. The method of claim 13, wherein said selecting the photocontrol device is based upon a signal strength from the photocontrol device received via the wireless network interface.

17. The method of claim 11, the command comprising disabling or enabling light output from the light fixture.

18. A photocontrol device for managing light output of a light fixture, comprising:
- a processor;
- a low power wireless network interface; and
- a memory configured with instructions that, when executed by the processor, cause the photocontrol device to:
  - receive, via the Bluetooth network interface, a request to establish a communication session with a remote device using the network interface, the request comprising a personal identification number (PIN);
  - receive, via the communication session with the remote device, a command to control the light output produced by a lighting element of the light fixture;
  - initiate performance of the command for the light fixture, the command superseding any other command from ambient light sensing logic of the photocontrol device; and
  - indicating a result of the performance of the command, said indicating comprising activation of the lighting element.

19. The system of claim 18, wherein the lighting element comprises a light emitting diode (LED) and the communication session is established using a Bluetooth protocol.

20. The system of claim 18, wherein the photocontrol device is attached to the light fixture via a National Electrical Manufacturers Association (NEMA) three-conductor receptacle.

21. The system of claim 18, wherein the command comprises disabling light output from the light fixture, the light output remaining disabled until a subsequent command is received to enable the light output.

* * * * *